Feb. 9, 1960

S. M. FAIRCHILD

APPARATUS FOR PRODUCING SCREENED RECORD SHEETS FOR IMAGE REPRODUCTION

Filed Aug. 16, 1954

2,924,653

United States Patent Office 2,924,653
Patented Feb. 9, 1960

2,924,653

APPARATUS FOR PRODUCING SCREENED RECORD SHEETS FOR IMAGE REPRODUCTION

Sherman M. Fairchild, New York, N.Y., assignor to Fairchild Camera and Instrument Corporation, a corporation of Delaware Application August 16, 1954, Serial No. 450,095

5 Claims. (Cl. 178—6.6)

Figure 1:
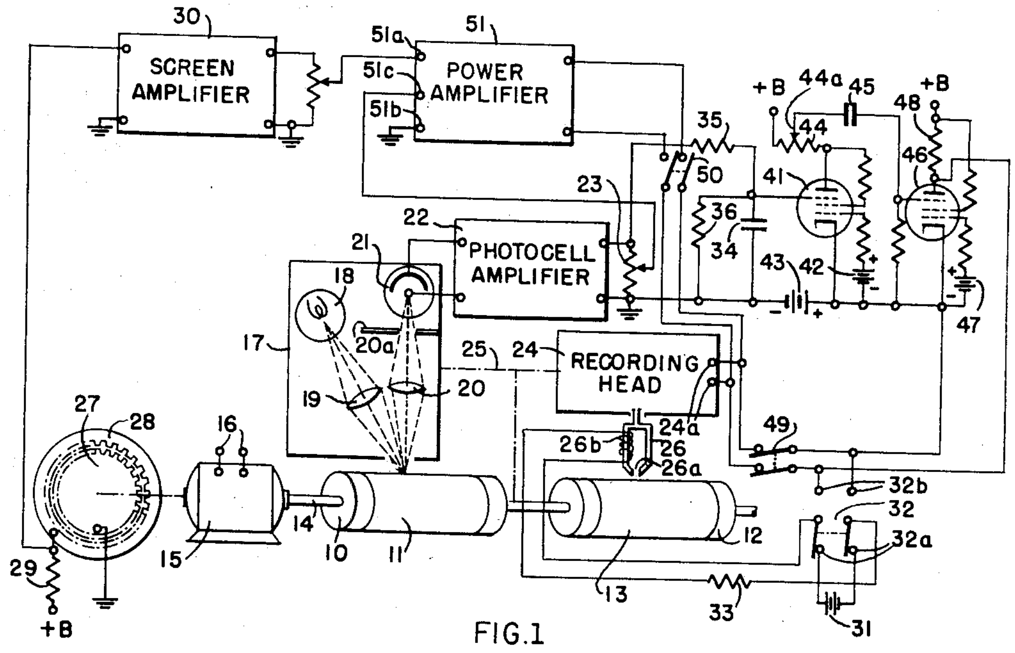

This invention relates to apparatus for producing screened record sheets for image reproduction and, more particularly, for producing such sheets for reproduction by offset or like processes.

In general, there are two broad classes of processes for producing half-tone plates or records for use in the printing industry. In one process, the printing record sheet has a screened relief surface and the printing is done from ink deposited either on the high parts or in the depressions and referred to as letterpress printing and gravure processes, respectively. Such screened relief prints may be made by the well-known photochemical process or by photoengraving apparatus of the type described in Letters Patent No. 2,575,546 to Boyajean. In the second process, the surface of the record sheet is treated by any of several known processes so that different portions either accept or repel ink, this planographic process resulting in so-called offset, hectograph and like lithographic processes. For example, a surface may be coated with a greasy composition which adheres to some portions and not to others and the record sheet so treated either accepts or rejects the printing ink used for image reproduction.

It has also been proposed heretofore to magnetize variably the surface of a printing medium in accordance with an electrical signal representative of an analysed image, such as in the sound-track for motion pictures and the like. For example, in an article entitled "Ferrography" in the Journal of the Franklin Institute of November 1951, there is described a system for producing a magnetic image on a record sheet having a coating of magnetic iron oxide. The record sheet is scanned synchronously with a photoelectric scanner of an image sheet, the output of which is utilized to magnetize successive elemental areas of the record sheet with an intensity varying with some function of the variations of the luminance of corresponding elemental areas of the image to be reproduced. Magnetic particles in the nature of ink particles are then deposited on the sheet from a liquid suspension, the sheet is dried, and the image transferred to paper by pressure.

However, it has been found that, in a system of the type described, the relationship between the density of magnetization of the deposited ink particles and the luminance of the image is decidedly non-linear. In the first place, the magnetization of the record sheet coating generally does not vary linearly with the luminance of the image because of non-linearity in various portions of the system, particularly the well-known non-linear B–H characteristic of the magnetic material. Furthermore, for values of magnetization below a certain threshold value, no magnetic ink particles are attracted. Therefore, there is considerable tone distortion in the resulting reproduced image.

It is an object of the present invention, therefore, to provide a new and improved apparatus and method for producing screened record sheets for image reproduction which obviates one or more of the above-described disadvantages of prior art image reproduction apparatus operating on the principle of magnetization of a coated record sheet.

It is another object of the invention to provide a new and improved apparatus for producing screened record sheets for image reproduction in which the average density of the elemental areas of the reproduced image vary substantially linearly with the luminance of the corresponding areas of the image being reproduced.

In accordance with the invention, apparatus for producing on a magnetizable record sheet from an image sheet a screened magnetic image suitable for image reproduction by offset processes comprises record-sheet and image-sheet supports, means including an electro-optical pick-up system for scanning an image sheet on its support to develop an electrical signal varying with variations in luminance of successive elemental areas of the image, and means including a reciprocable magnetic recording head for scanning a record sheet on its support synchronously with the image-sheet scanning means, such recording head including an actuating winding and a magnetizing winding. The apparatus also comprises means for developing a periodic pulse signal the pulses of which are of durations varying with the magnitude of such electrical signal, and a circuit for applying such pulse signal to the actuating winding of the recording head to reciprocate the same, thereby to develop a screened magnetic pattern on the record sheet comprising discrete spaced magnetized elements of different areas.

For a better understanding of the present invention, together with other and further objects thereof, reference is had to the following description taken in connection with the accompanying drawing, while its scope will be pointed out in the appended claims.

Figure 2:
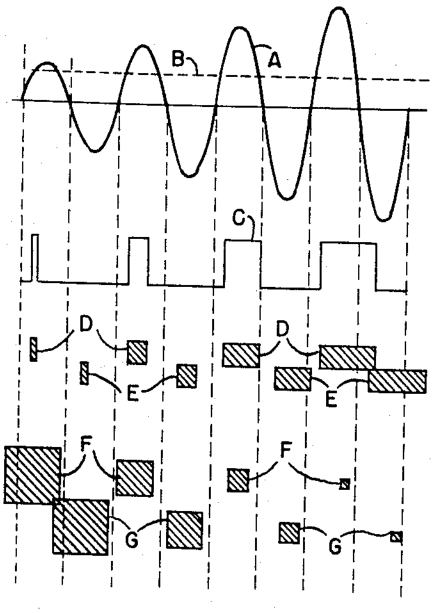

Referring now to the drawing:

Fig. 1 is a schematic representation of an apparatus for producing screened record sheets for image reproduction embodying the present invention; while Fig. 2 is a series of curves representing certain operating charcteristics of the apparatus of Fig. 1 to aid in explaining the invention.

Referring now to Fig. 1 of the drawing, there is represented a machine for producing on a magnetizable record sheet from an image sheet a screened magnetic image or impression suitable for image reproduction by offset processes and embodying the present invention. The apparatus of Fig. 1 comprises a support in the form of a cylinder 10 for an image sheet 11 and a support in the form of a cylinder 12 for a record sheet 13. The cylinders 10 and 12 are mounted on a common shaft 14 connected to be driven by suitable means, such as a motor 15 energized from supply circuit terminals 16, 16. The apparatus of Fig. 1 also comprises means including an electro-optical pick-up system 17 for scanning the image sheet 11 on its support to develop an electrical signal varying with variations in luminance of successive elemental areas of the image. The pick-up system 17 may, for example, include a suitable light source 18 and a condensing lens 19 for converging the light from source 18 to a point at the image sheet 11. Preferably light source 18 is energized from a pulsating light source synchronous with the screen-frequency signal, as described in more detail in aforesaid Patent 2,575,546. The unit 17 also includes a second condensing lens 20 for picking up reflected light from the image sheet 11 and converging it upon a photocell or other photoresponsive device 21 and an aperture plate 20_a_ between the lens 20 and photocell 21 for defining the elemental image area. The device 21 is connected to the input circuit of a conventional photocell amplifier unit 22 having an output or load resistor 23 across which is developed the amplified periodic signal developed by the photocell 21 and varying in amplitude from instant to instant with variations in the luminance of successive elemental areas of the image sheet 11.

The apparatus of Fig. 1 also comprises means including a magnetic recording head 24 for scanning the record sheet on its support synchronously with the scanning of the image sheet 11 by unit 17. To this end, the units 17 and 24 are mechanically interconnected by suitable transverse feed mechanism indicated schematically at 25, connected to be driven by shaft 14. The recording head 24 includes a reciprocable magnetizing element 26 which is in the form of a magentic loop closed except for a narrow air gap 26*a* adjacent the record sheet 13. The unit 26 is provided with an exciting winding 26*b*. The apparatus also includes means for developing a periodic signal synchronously related to the scanning of the image and record sheets, this means comprising a capacitance generator comprising a toothed rotor 27 disposed within and co-operating with a toothed stator 28, the rotor 27 being connected to be driven by the motor 15 which drives the record-sheet and image-sheet supports 10, 12. The elements 27, 28 are connected by way of a load resistor 29 to the input circuit of a screen amplifier 30. It will be understood that the portion of the apparatus so far described, with the exception of the magnetizing element 26, may be of conventional form and construction, for example, of the type illustrated and described in aforesaid Patent 2,575,546, so that detailed description of the particular elements thereof is unnecessary herein.

In accordance with the present invention, the apparatus of Fig. 1 may be operated either to form a record sheet comprising a pattern of discrete, spaced, magnetized portions of the record sheet 13 of uniform width but variable length, or to produce such a record sheet with a screen pattern comprising a series of discrete magnetized portions of similar shape or form, but different areas. In order to provide a record sheet of the former type, there is provided a means for constantly exciting the magnetizing unit 26 of the recording head 24, this means comprising any suitable source, such as a battery 31, connectible through a double-pole double-throw switch 32 and a current-limiting resistor 33 to the winding 26*b*.

The apparatus further comprises means for deriving from the epriodic electrical signal developed by the photocell amplifier 22 a pulse signal, the pulses of which are of constant amplitude and of durations varying with the magnitude of such electrical signal. This pulse deriving means may be in the form of a time-constant circuit and an amplifier-limiter including a condenser 34 connected to be charged from the potential across the resistor 23 through a resistor 35. The capacitor 34 is provided with a discharge resistor 36 and is connected to the outer control grid of a pentode amplifier tube 41, the inner control grid of which is provided with a positive bias from a suitable source, such as a battery 42, so that it comprises essentially a space-charge grid imparting a constant-current characteristic to the tube 41. The outer control grid of tube 41 is normally biased to maintain the tube non-conductive, as by a suitable battery 43.

The tube 41 is provided with an output load resistor 44 having an adjustable tap 44*a* which is connected through a coupling capacitor 45 to the outer control grid of a second pentode power amplifier 46, also having its inner control grid provided with a source of positive bias 47 to impart to the tube a constant-current characteristic. The tube 46 is provided with a load resistor 48. As described in more detail hereinafter, the time-constant circuit 34, 35, 36 and the tubes 41 and 46 and their associated elements are effective to develop across load resistor 48 a periodic pulse wave in which the pulses have a duration varying with the amplitude of the periodic electrical signal developed by photocell amplifier 22 across resistor 23. The switch 32, when connected to close its contacts 32*b*, 32*b* is effective to excite the winding 26*b* with the pulse wave developed across resistor 48.

The recording-head unit 24 of the apparatus of Fig. 1 includes a suitable actuating winding (not shown) having terminals 24*a*, 24*a* and preferably of the character illustrated and described in aforesaid Patent 2,575,546. This actuating winding is connected through a double-pole switch 49 to the output circuit of the tube 46 to be actuated by the constant amplitude periodic pulses of varying duration. Alternatively, the terminals 24*a* of the unit 24 may be energized through a double-pole switch 50 from a modulator-power amplifier unit 51 in which the periodic signal supplied by the screen amplifier and connected to the input terminals 51*a*, 51*b* is modulated by the electrical signal developed by the amplifier 22 and applied to the terminals 51*b*, 51*c*, and further amplified.

When it is desired to form a record sheet of the first type described above, that is, in which the magnetized areas are of uniform width but variable length, the switch 32 is operated to close its contacts 32*a*, 32*a*, the switch 49 is closed, and the switch 50 is open, as illustrated in the drawing. Under these conditions, as the image-sheet and record-sheet cylinders 10 and 12 are rotated by the motor 15 and the scanning units 17 and 24 synchronously scan the image sheet and the record sheet, respectively, the photocell 21 and the amplifier 22 develop across resistor 23 a periodic electrical signal, due to the periodic excitation of the source 18, varying in amplitude from instant to instant in accordance with variations in the luminance of successive elemental portions of the image 11. Successive positive pulses of this signal across resistor 23 are effective to charge the condenser 34 through resistor 35, the condenser discharging through resistor 36 between pulses. The tube 41 is normally biased to a non-conductive state by battery 43 but, as the voltage across 34 rises during charging, it overcomes the bias of battery 43 and renders the tube 41 conductive.

Referring to Fig. 2, curve A represents the periodic signal developed across resistor 23, which is indicated as one progressively increasing in amplitude in correspondence with a scanned line of progressively increasing luminance. The dotted line B represents the negative bias on the outer grid of the tube 41, which corresponds to space current cut-off. Therefore, the outer grid of the tube 41 conducts only during the portions of curve A above reference line B and, by grid rectification, incrementally charges the capacitor 34 during each positive pulse of curve A, rendering the tube 41 conductive. The charge on the capacitor 34 leaks off between pulses through resistor 36, the time required for the charge to leak off varying with the amount of charge on the capacitor which, in turn, is roughly proportional to the areas of the pulses of curve A above the line B. Therefore, there is developed in the anode-cathode circuit of the tube 41 a series of current pulses represented by curve C of Fig. 2 which, of course, also represents the voltage pulses developed across its load resistor 44. These pulses are applied through condenser 45 to the outer control grid of tube 46 wherein they are reversed in polarity and amplified, appearing across its load resistor 48.

Since both tubes 41 and 46 are essentially constant-current devices, the voltage pulses developed across resistor 48 are of substantially rectangular wave form and constant amplitude as represented by curve C inverted.

These constant amplitude pulses, curve C inverted, are applied through switch 49 and the terminals 24*a*, 24*a* to the actuating element of recording head 24 to reciprocate its magnetizing unit 26 so that it is driven close to the record sheet during the pulses and is withdrawn substantially from the record sheet in the intervals between such pulses. The magnetizing unit 26 is constantly excited from the source 31 through the switch contacts 32*a*, 32*a*. The energization of the magnetizing unit 26 is so proportioned that, when it is in its position nearest the record sheet 13, the magnetic material of the sheet is saturated in the immediate vicinity of the air gap of the unit, and, when the magnetizing unit is farthest away from the record sheet 13, there is no substantial magnetization. The discrete magnetized areas of the sheet 13 then appear as represented by the shaded areas D of Fig. 2 which, it is seen, are of different lengths but uniform widths. Corresponding magnetized elements of record sheet 13 in the adjacent scanning line are represented by the shaded areas E of Fig. 2 which are staggered with respect to the areas D in accordance with conventional engraving practice. Thus, with a magnetic record sheet formed as described, the variations in tone values of the image to be reproduced are represented by magnetized elements of different areas but magnetized with uniform intensity, thus avoiding discontinuities and non-linearities occurring when it is attempted to vary the intensity of the magnetization in accordance with the luminance of successive elemental areas.

When it is desired to form a record sheet in which the magnetized areas are the same shape but different areas, the switch 32 is operated to close its contacts **32*b*, 32*b*, the switch 49 is opened, and the switch 50 is closed. Under these conditions, the voltage pulse represented by the inverse of curve C of Fig. 2 is, as before, developed across the load resistor 48 of tube 46 and is applied through switch 32*b* to the exciting winding 26*b* of magnetizing unit 26. At the same time, the periodic electric signal developed across the resistor 23 is applied to the input terminals 51*b*, 51*c* of modulator 51 to modulate the screen-frequency signal developed by amplifier 30 and applied to terminals 51*a*, 51*b* of modulator 51. There is, therefore, developed in the output circuit of modulator 51 a periodic electrical signal of the general character represented by curve A of Fig. 2, in which the modulation may be somewhat more pronounced. This modulated signal then is applied to the actuating unit of recording head 24 to reciprocate the same synchronously with the periodic pulses applied to the magnetizing unit 26**.

In this arrangement, the excitation of the magnetizing unit 26 is so proportioned that it substantially saturates the elemental area of the record sheet 13 immediately below the air gap **26*a* even when the recording head is disposed at a maximum distance from the record sheet. With this arrangement, when the magnetizing unit 26 is closest to the record sheet 13, the magnetic field at the gap 26*a* is concentrated so that only a small elemental area of the record sheet 13 is magnetized. However, as the magnetizing unit 26 is separated from the record sheet 13, its magnetic field progressively spreads out so that the magnetized elements progressively increase in area. This is represented by the shaded areas F of Fig. 2, the largest area to the left corresponding to an elemental area of minimum luminance and, therefore, to a modulated periodic signal applied to the recording head 24 of minimum amplitude. As the amplitude of the modulated periodic signal increases, so that the magnetizing unit 26 is progressively actuated closer and closer to the record sheet 13, the magnetized areas become progressively smaller. However, with this arrangement the several magnetized areas are all of the same shape, as represented by the idealized shaded areas F of Fig. 2. The similar shaded areas G of Fig. 2 represent a similar luminance pattern of the succeeding scanned line. In the arrangement last described, the periodic pulse signal of curve C is applied to the magnetizing element 26 with such a polarity that the negative going pulses are effective to energize the unit during the portion of the periodic movement of the recording head when the magnetizing element 26 is closest to the record sheet 13**.

After formation of the magnetic record sheet by either of the methods described above, the coated surface of the sheet is first wet and then wiped with a mixture of iron powder and a greasy composition, the mixture adhering to the magnetized areas but not to the unmagnetized areas to form a half-tone pattern which is conventional, except for variation in shapes of the elemental areas in the case of a record sheet formed by the first method. This record sheet is then utilized to reproduce an image by offset printing, hectograph, or the like. For each printing operation thereafter the sequence of operations is (1) to wet the surface; (2) apply the ink; and (3) print. It is characteristic of printing by such a method that a greasy ink will attract more greasy ink and the additional applied ink effects the printing, the unmagnetized areas of the record sheet repelling the printing ink.

While the specific character of the magnetic record sheet and the mixture of iron powder and greasy composition, per se, form no part of the present invention, the following specifications are suitable for use in connection with applicant's invention: The record sheet may be a plastic or paper base having a thickness of 0.002 inch with a coating of a thickness of the order of 0.001 inch of a powdered magnetic material in a suitable binder. The powdered magnetic material is preferably one having an approximately rectangular B–H loop configuration, for example, a nickel-iron alloy, a nickel-iron-cobalt alloy, a molybdenum-iron alloy or a magnetic iron oxide (ferrite).

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Apparatus for producing on a magnetizable record sheet from an image sheet a screened magnetic image suitable for image reproduction by offset processes comprising: record-sheet and image-sheet supports; means including an electro-optical pick-up system for scanning an image sheet on its support to develop an electrical signal varying with variations in luminance of successive elemental areas of the image; means including a reciprocable magnetic recording head for scanning a record sheet on its support synchronously with said first scanning means, said recording head including an actuating winding and a magnetizing winding; means for developing a periodic pulse signal the pulses of which are of durations varying with the magnitude of said electrical signal; and a circuit for applying said pulse signal to said actuating winding of said recording head to reciprocate the same for developing a screened magnetic pattern on said record sheet comprising discrete spaced magnetized elements of different areas.

2. Apparatus for producing on a magnetizable record sheet from an image sheet a screened magnetic image suitable for image reproduction by offset processes comprising: record-sheet and image-sheet supports; means including an electro-optical pick-up system for scanning an image sheet on its support to develop an electrical signal varying with variations in luminance of successive elemental areas of the image; means including a reciprocable magnetic recording head for scanning a record sheet on its support synchronously with said first scanning means, said recording head including an actuating winding and a magnetizing winding; means for constantly exciting said recording head; means for developing a periodic pulse signal the pulses of which are of durations varying with the magnitude of said electrical signal; and a circuit for applying said pulse signal to said actuating winding of said recording head to reciprocate the same for developing a screened magnetic pattern on said record sheet comprising discrete spaced magnetized elements of different lengths and uniform width.

3. Apparatus for producing on a magnetizable record sheet from an image sheet a screened magnetic image suitable for image reproduction by offset processes comprising; record-sheet and image-sheet supports; means including an electro-optical pick-up system for scanning an image sheet on its support to develop an electrical signal varying with variations in luminance of successive elemental areas of the image; means including a magnetic recording head for scanning a record sheet on its support synchronously with said first scanning means, said recording head including an actuating winding and a magnetizing winding; means for developing a periodic pulse signal the pulses of which are of constant amplitude and of durations varying with the magnitude of said electrical signal; and a circuit for applying said pulse signal to said magnetizing winding of said recording head to develop a screened magnetic pattern on said record sheet comprising discrete spaced magnetized elements of different areas, the amplitude of said periodic pulses being sufficient to saturate said magnetized areas.

4. Apparatus for producing on a magnetizable record sheet from an image sheet a screened magnetic image suitable for image reproduction by offset processes comprising: record-sheet and image-sheet supports; means including an electro-optical pick-up system for scanning an image sheet on its support to develop an electrical signal varying with variations in luminance of successive elemental areas of the image; means including a reciprocable magnetic recording head for scanning a record sheet on its support synchronously with said first scanning means, said recording head including an actuating winding and a magnetizing winding; means for developing a periodic pulse signal synchronous with the reciprocation of said recording head and the pulses of which are of durations varying with the magnitude of said electrical signal; and a circuit for applying said pulse signal to said magnetizing winding of said recording head to excite the same for developing a screened magnetic pattern on said record sheet comprising discrete spaced magnetized elements of different areas.

5. Apparatus for producing on a magnetizable record sheet from an image sheet a screened magnetic image suitable for image reproduction by offset processes comprising: record-sheet and image-sheet supports; means including an electro-optical pick-up system for scanning an image sheet on its support to develop an electrical signal varying with variations in luminance of successive elemental areas of the image; means including a reciprocable magnetic recording head for scanning a record sheet on its support synchronously with said first scanning means, said recording head including an actuating winding and a magnetizing winding; means for developing a periodic signal synchronously related to the scanning of said image and record sheets; means for modulating said periodic signal with said electrical signal; means for deriving from said electrical signal a pulse signal the pulses of which are of durations varying with the magnitude of said electrical signal; a circuit for applying said modulated periodic signal to said actuating winding of said recording head to reciprocate the same; and a circuit for applying said pulse signal to said magnetizing winding of said recording head to excite the same for developing a screened magnetic pattern on said record sheet comprising discrete spaced magnetized elements of the same shape but of different areas.

References Cited in the file of this patent

UNITED STATES PATENTS 2,149,487 Zilberman ---------------- Mar. 7, 1939
2,312,042 Losier et al. -------------- Feb. 23, 1943

FOREIGN PATENTS 1,053,634 France ------------------- Feb. 3, 1954